N. COLAIACORO.
RECEPTACLE FOR WATER OR OTHER LIQUIDS.
APPLICATION FILED FEB. 16, 1915.
1,185,368.
Patented May 30, 1916.
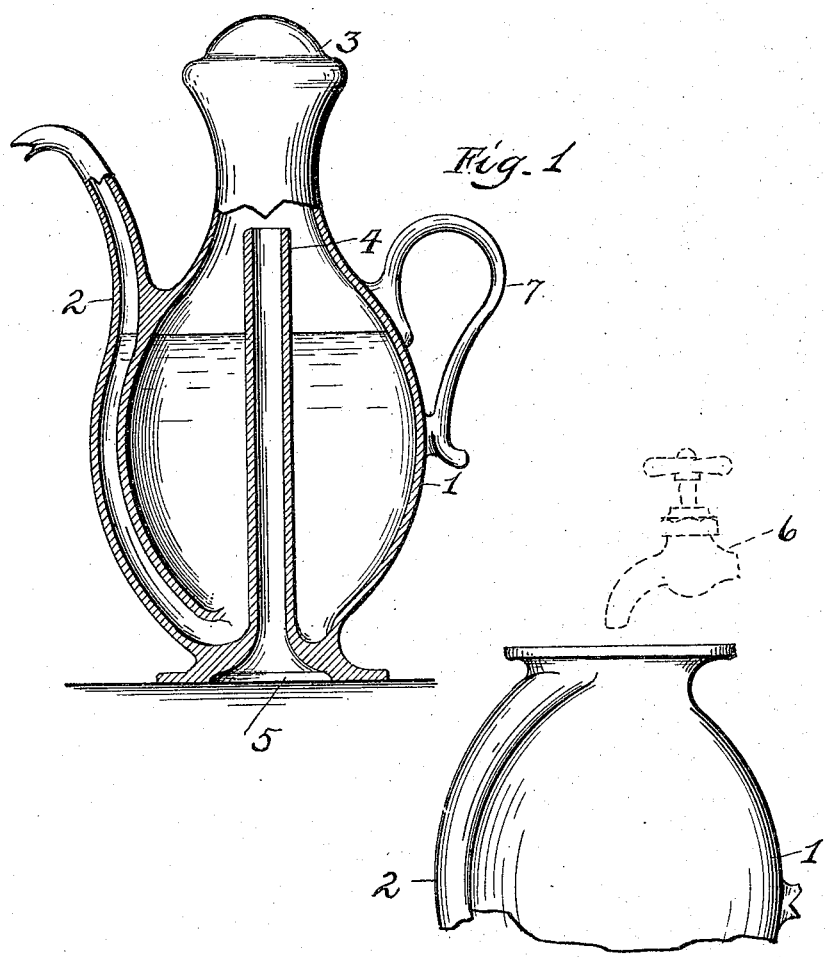

UNITED STATES PATENT OFFICE.

NICHOLAS COLAIACORO, OF NEW KENSINGTON, PENNSYLVANIA, ASSIGNOR OF TWO-THIRDS TO FRANK SCARCI AND CARMINE CARROZZA, BOTH OF NEW KENSINGTON, PENNSYLVANIA.

RECEPTACLE FOR WATER OR OTHER LIQUIDS.

1,185,368.  Specification of Letters Patent.  Patented May 30, 1916.

Application filed February 16, 1915. Serial No. 8,698.

*To all whom it may concern:*

Be it known that I, NICHOLAS COLAIACORO a subject of the King of Italy, residing at New Kensington, in the county of Westmoreland and State of Pennsylvania, have invented certain new and useful Improvements in Receptacles for Water or other Liquids; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved receptacle for water or other liquids.

The object is to provide a pitcher capable of containing a quantity of liquor, said pitcher being so constructed that should it be upset or tilted the contents will not spill or escape, and that the contents may be easily removed through a spout arranged for that purpose, and the invention further consists in the certain details of construction, as will be fully described hereinafter.

In the accompanying drawings;—Figure 1 is a side sectional view, partly in elevation, of a water pitcher, the same being constructed and arranged in accordance with my invention. Fig. 2, is an inverted side elevation of a portion of the same, showing the manner of filling the said pitcher with water or other liquid.

To put my invention into practice I form from suitable material, such as glass, china clay, etc., a pitcher comprising a body-portion 1, of any desired shape or form of design, having a closed top 3, and at one side a spout 2, through which the contents may be removed from the pitcher, in a manner common in the art, said spout extending to the bottom of the pitcher. Centrally located within the body of the pitcher 1, is a vertically-disposed tube 4, open at the top, and having an external entrance 5, at the base, by means of which the pitcher may be filled. The pitcher is fitted with a suitable handle 7, located on the side opposite and in line with the above-mentioned spout 2.

When filling the pitcher with water, etc., the same is inverted (as at Fig. 2 of the drawings), and it is obvious that should said pitcher be upset the contents would not escape.

Among the advantages of a pitcher, constructed as described, are that of being sanitary, and that the contents cannot be spilled even should the pitcher be accidentally upset.

Modifications and changes may be made in the details of construction, without departing from the spirit of the invention.

Having thus described my invention, I claim;—

A receptacle for water or other liquids, comprising a body portion capable of containing a quantity of such liquid, a central vertically-disposed filling tube terminating at a point near the top of the receptacle and communicating with the exterior at the bottom of the same, a spout leading from a point near the base of the receptacle and terminating above the filling tube, a closed top and a suitable handle for said receptacle.

In testimony whereof I affix my signature in presence of two witnesses.

NICHOLAS COLAIACORO.

Witnesses:
M. H. MAINWARING,
M. E. HARRISON.

Copies of this patent may be obtained for five cents each, by addressing the "Commissioner of Patents, Washington, D. C."